(12) United States Patent
Ding et al.

(10) Patent No.: US 10,178,606 B2
(45) Date of Patent: Jan. 8, 2019

(54) MESSAGE TRANSMISSION METHOD, MESSAGE RECEPTION METHOD AND APPARATUS AND STORAGE MEDIUM

(71) Applicant: Xiaomi Inc., Beijing (CN)

(72) Inventors: Yi Ding, Beijing (CN); Enxing Hou, Beijing (CN); Kanjie Zhu, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/279,009

(22) Filed: Sep. 28, 2016

(65) Prior Publication Data

US 2017/0094587 A1 Mar. 30, 2017

(30) Foreign Application Priority Data

Sep. 28, 2015 (CN) .......................... 2015 1 0628252

(51) Int. Cl.
*H04W 48/10* (2009.01)
*H04W 8/22* (2009.01)
(Continued)

(52) U.S. Cl.
CPC ............ *H04W 48/10* (2013.01); *H04L 67/141* (2013.01); *H04L 69/18* (2013.01); *H04W 4/80* (2018.02);
(Continued)

(58) Field of Classification Search
CPC ....... H04W 48/10; H04W 4/008; H04W 8/22; H04W 76/023; H04W 84/18; H04L 41/12; H04L 67/141; H04L 69/18
(Continued)

(56) References Cited

U.S. PATENT DOCUMENTS 5,802,065 A * 9/1998 Ogawa .................... H04L 29/06
370/394
6,975,610 B1 12/2005 Van Der Tuijn et al.
(Continued)

FOREIGN PATENT DOCUMENTS

CN 1513159 A 7/2004
CN 101193042 A 6/2008
(Continued)

OTHER PUBLICATIONS

Extended European Search Report dated Feb. 1, 2017 for European Application No. 16190547.6, 6 pages.
(Continued)

*Primary Examiner* — Edward Urban
*Assistant Examiner* — Ralph H Justus
(74) *Attorney, Agent, or Firm* — Brinks, Gilson & Lione

(57) ABSTRACT

This disclosure relates to a message transmission method, a message reception method and corresponding apparatuses and storage mediums. The message transmission method may be performed by a first Bluetooth device and may involve generating, by a processor of the first Bluetooth device, a beacon frame message based on an intended interaction purpose with a second Bluetooth device, wherein the beacon frame message contains one or more fields indicating the interaction purpose, and broadcasting the beacon frame message using a Bluetooth communication interface of the first Bluetooth device. By including one or more fields indicating the intended interaction purpose within the beacon message frame, the first Bluetooth device and a second receiving Bluetooth device may be able to interact with one another without having to first establish a connection there between, thereby overcoming limitations of traditional Bluetooth communication schemes.

18 Claims, 11 Drawing Sheets

(51) Int. Cl.
  *H04W 4/00*  (2018.01)
  *H04L 29/08*  (2006.01)
  *H04L 29/06*  (2006.01)
  *H04W 84/18*  (2009.01)
  *H04W 8/00*  (2009.01)
  *H04W 12/02*  (2009.01)
  *H04W 4/80*  (2018.01)
  *H04W 76/14*  (2018.01)

(52) U.S. Cl.
  CPC ............. *H04W 8/005* (2013.01); *H04W 8/22* (2013.01); *H04W 12/02* (2013.01); *H04W 76/14* (2018.02); *H04W 84/18* (2013.01)

(58) Field of Classification Search
  USPC ........................................................ 455/41.1
  See application file for complete search history.

(56) References Cited

U.S. PATENT DOCUMENTS

| | | | | |
|---|---|---|---|---|
| 9,392,398 | B2* | 7/2016 | Yang | H04W 8/005 |
| 9,712,951 | B2* | 7/2017 | Kirshenberg | H04W 28/18 |
| 9,743,222 | B2* | 8/2017 | Choi | H04W 4/008 |
| 2002/0194141 | A1 | 12/2002 | Langensteiner | |
| 2004/0028123 | A1* | 2/2004 | Sugar | H04L 1/1664 |
| | | | | 375/224 |
| 2004/0187040 | A1* | 9/2004 | Sasagawa | G06F 1/3203 |
| | | | | 713/300 |
| 2004/0218683 | A1* | 11/2004 | Batra | H04L 27/0008 |
| | | | | 375/261 |
| 2005/0090264 | A1* | 4/2005 | Kim | H04W 48/10 |
| | | | | 455/455 |
| 2005/0125840 | A1 | 6/2005 | Anderson et al. | |
| 2008/0247376 | A1 | 10/2008 | Del Prado Pavon et al. | |
| 2009/0092210 | A1* | 4/2009 | Green | H04J 3/0605 |
| | | | | 375/354 |
| 2009/0132728 | A1* | 5/2009 | Fukui | H04N 5/44513 |
| | | | | 710/8 |
| 2013/0065584 | A1* | 3/2013 | Lyon | H04W 28/06 |
| | | | | 455/434 |
| 2014/0146727 | A1 | 5/2014 | Segev et al. | |
| 2014/0222574 | A1 | 8/2014 | Emigh et al. | |
| 2014/0323048 | A1* | 10/2014 | Kang | H04W 4/80 |
| | | | | 455/41.2 |
| 2015/0245393 | A1* | 8/2015 | Lee | H04W 8/005 |
| | | | | 370/338 |
| 2016/0080343 | A1* | 3/2016 | Robinton | H04W 12/04 |
| | | | | 726/4 |

FOREIGN PATENT DOCUMENTS

| | | |
|---|---|---|
| CN | 102184352 A | 9/2011 |
| CN | 103135461 A | 6/2013 |
| CN | 103793833 A | 5/2014 |
| CN | 104933784 A | 9/2015 |
| JP | 2004-501566 A | 1/2004 |
| JP | 2007-525891 A | 9/2007 |
| JP | 2014-093686 A | 5/2014 |
| RU | 2 371 872 C2 | 10/2009 |
| WO | WO 2009/061036 A1 | 5/2009 |
| WO | WO 2015/034755 A1 | 3/2015 |
| WO | WO 2015/047657 A1 | 4/2015 |

OTHER PUBLICATIONS

Townsend, Kevin et al., "Getting Started with Bluetooth Low Energy," O'Reilly Media Inc., copyright 2014, 180 pages.
English Translation of International Search Report dated Jun. 29, 2016 for International Application No. PCT/CN2015/099607, 2 pages.
International Search Report and Written Opinion dated Jul. 4, 2016 for International Application No. PCT/CN2015/099607, 10 pages.
Office Action dated Nov. 28, 2017 for Japanese Application No. 2016-520044, 4 pages.
Office Action dated Jul. 5, 2017 for Chinese Application No. 201510628252.3, 8 pages.
Office Action dated Jul. 12, 2017 for Russian Application No. 2016122382/07, 8 pages.
Office Action dated May 30, 2018 for Chinese Application No. 2015-10628252.3, 8 pages.
English Translation of International Preliminary Report on Patentability dated Apr. 3, 2018 for International Application No. PCT/CN2015/099607, (7p).
International Preliminary Report on Patentability dated Apr. 3, 2018 for International Application No. PCT/CN2015/099607, (4p).

\* cited by examiner

| Byte | 1 | 2-3 | 4 | 5 | 6 | 7-8 | 9 | 10-15 | 16 |
|---|---|---|---|---|---|---|---|---|---|
| Field Name | Length | Server Data | Manufacturer Service | Service Information | Frame Control | Device Identification | Frame Counter | MAC Address | Capability |

MESSAGE TRANSMISSION METHOD, MESSAGE RECEPTION METHOD AND APPARATUS AND STORAGE MEDIUM

RELATED APPLICATIONS

The present patent document claims the benefit of priority to Chinese Patent Application No. 2015106282523, filed Sep. 28, 2015, and entitled "Message Transmission Method, and Message Reception Method and Apparatus," which is incorporated herein by reference in its entirety.

TECHNICAL FIELD

The present disclosure generally relates to the field of communications, and more particularly, relates to a message transmission method, a message reception method and apparatus and a storage medium.

BACKGROUND

Wireless technology standards for exchanging data over short distances, such as Bluetooth are used in many electronic devices. Popular devices such as headphones, loudspeakers, anti-drop devices, wearables, and the like may use Bluetooth technologies. Communication over Bluetooth typically requires establishing a safe connection between the two devices since services offered over Bluetooth can expose private data or let a connecting party control the device.

This is typically accomplished in Bluetooth through a process called bonding, where a bond is generated between the two devices through a process called pairing. Pairing often involves some level of user interaction, which helps to confirm the identity of the devices being paired. When pairing successfully completes, a bond forms between the two devices, enabling those two devices to establish a connection with one another in the future without repeating the pairing process to confirm device identities.

But under this traditional model, devices are unable to communicate with one another until the devices have been paired and a connection has been established. Moreover, traditional connection based communication schemes are further limiting in that they typically only allow for a single active connection between devices. While a Bluetooth device may be able to bind with several other Bluetooth devices, it may only establish a connection with one device at a time.

SUMMARY

In many situations, however, it may be beneficial to allow devices to communicate with one another without the need to go through the inconvenient and potentially laborious pairing process. By way of example, in the context of home automation, a homeowner may have physically secured their home and may not be as concerned with unauthorized access or use of Bluetooth enabled devices that are within the home (e.g., a living room lamp, an air conditioning unit in the basement, or a stereo system in the den). If the homeowner allows a guest into their home, they likely trust the guest to interact with the devices therein, and may want to allow the guest to adjust the lights within a room, or control the music being played through the sound system, without the guest needing to go through the process of establishing a connection with the device. In some instances, it may also be advantageous to allow a single device to control multiple devices over Bluetooth simultaneously, which a typical connection-based scheme simply does not allow. A homeowner, for example, may have several lighting fixtures (e.g., canned lights, floor and table lamps, etc.) within a single room that they wish to control together. The homeowner, for example, may want all the lights to turn on when they enter a room or may wish to dim all of the lights uniformly with a single command. The description provided below covers various methods, systems, logic and devices that allow for communication and interaction between devices using the Bluetooth protocol that obviate the need to first establish a connection between the devices and allow for communication with and interaction between multiple Bluetooth devices simultaneously.

According to a first aspect of the present disclosure, a message transmission method is provided that involves generating, by a processor of a first Bluetooth device, a beacon frame message based on an intended interaction purpose with a second Bluetooth device; and broadcasting the beacon frame message using a Bluetooth communication interface of the first Bluetooth device; wherein the beacon frame message contains one or more fields indicating the interaction purpose.

According to a second aspect, a message reception method is provided that involves receiving a beacon frame message broadcast by a first broadcasting device using a Bluetooth communication interface of a second Bluetooth device, wherein the beacon frame message contains one or more fields indicating the interaction purpose; and processing, by a processor of the second Bluetooth device, the beacon frame message including the one or more fields indicating the interaction purpose.

According to a third aspect, a message transmission apparatus is provided, which includes a processor, a Bluetooth communication interface in communication with the processor, and a memory in communication with the processor storing instructions executable by the processor, wherein the processor is configured to generate a beacon frame message based on an intended interaction purpose with a second Bluetooth device, wherein the beacon frame message contains one or more fields indicating the interaction purpose, and broadcast the beacon frame message via the Bluetooth communication interface.

According to a fourth aspect, a message reception apparatus is provided, which includes a processor, a Bluetooth communication interface in communication with the processor, and a memory in communication with the processor storing instructions executable by the processor, wherein the processor is configured to receive a become frame message generated by a first Bluetooth device via the Bluetooth communication interface, wherein the beacon frame message contains one or more fields indicating an interaction purpose, and process the beacon frame message including the one or more fields indicating the interaction purpose.

According to a fifth aspect of the embodiments of the present disclosure, there is provided a non-transitory computer-readable storage medium having instructions stored thereon that, when executed by a processor of a receiving mobile terminal in communication with a Bluetooth communication interface, cause the processor to receive a become frame message generated by a first Bluetooth device via the Bluetooth communication interface, wherein the beacon frame message contains one or more fields indicating an interaction purpose, and process the beacon frame message including the one or more fields indicating the interaction purpose.

It should be understood that both the foregoing summary and the following detailed description are only exemplary and explanatory and are not restrictive of the invention.

BRIEF DESCRIPTION OF THE DRAWINGS

The innovation may be better understood with reference to the following drawings and description. In the figures, like reference numerals designate corresponding parts throughout the different views.

DETAILED DESCRIPTION

The following description may describe various embodiments, examples of which are illustrated in the accompanying drawings. The implementations set forth below are not intended to be limiting and instead provide illustrative examples of the various concepts described herein.

System Environment

Figure 1:
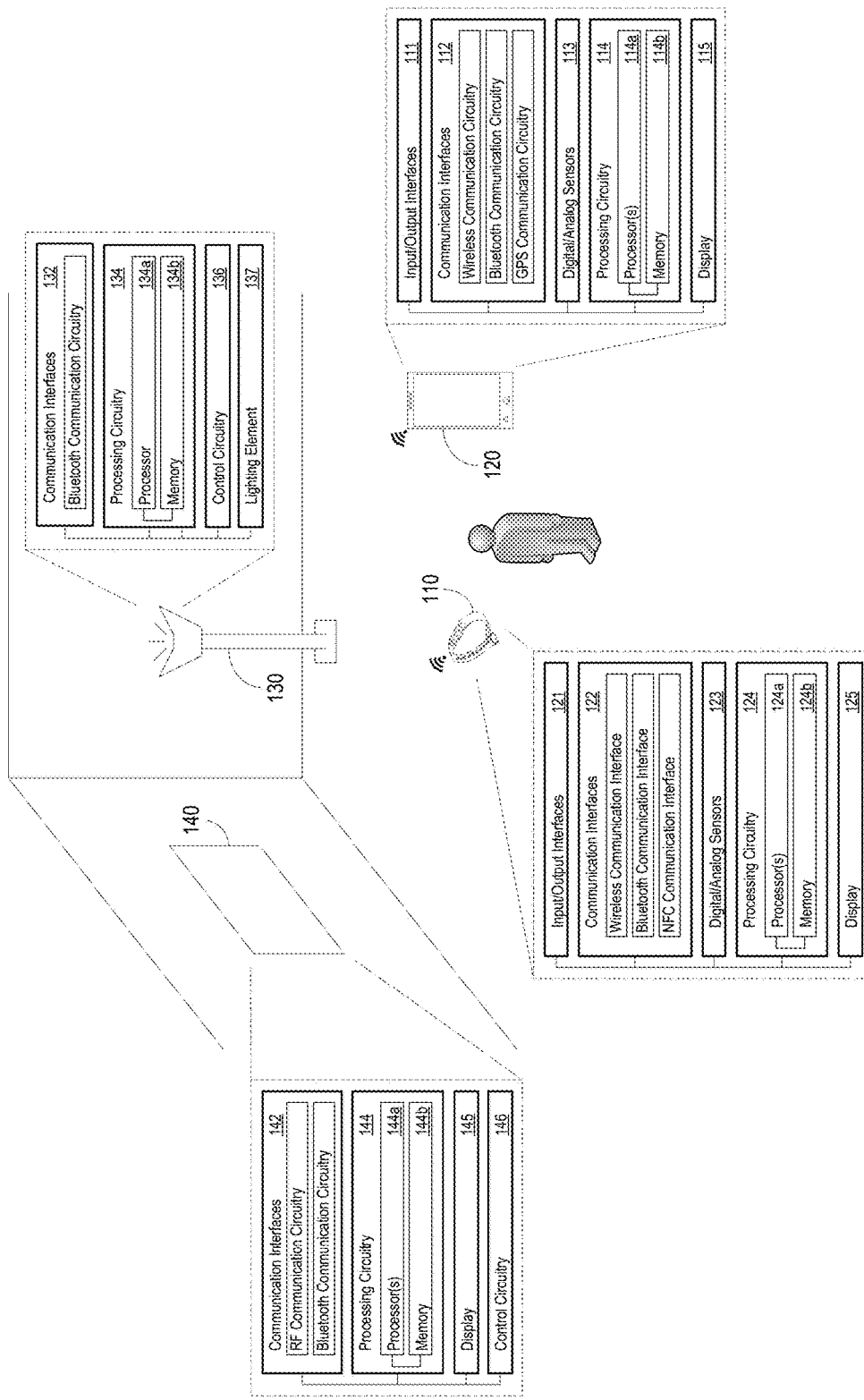
FIG. 1 illustrates an example of a system environment in which different Bluetooth devices may interact.

FIG. 1 illustrates an example of a system environment in which different Bluetooth devices may interact. The system environment 100 may include any number of devices having Bluetooth capabilities. As illustrated in FIG. 1, for example, the system environment may include a smart bracelet 110, a smart cell phone 120, an electric light 130, and a television 140.

The smart bracelet 110 may include one or more input/output interfaces 111, one or more communication interfaces 112, one or more digital/analog sensors 113, processing circuitry 114, including one or more processors 114a and memory 114b, and a display 115, which may all be in electronic communication with one another. The communication interfaces 112 may include wireless communication circuitry, Bluetooth communication circuitry, NFC communication circuitry, or the like. In some embodiments, the Bluetooth communication circuitry may take the form of a Bluetooth low energy (BLE) integrated circuit. The Bluetooth communication circuitry may allow the smart bracelet 110 to communicate using the Bluetooth protocol. The smart bracelet 110 may be capable of transmitting and/or receiving data using the Bluetooth circuitry. The smart bracelet 110, for example, using the processing circuitry 114, may be able to generate and broadcast a beacon frame message, or receive and process a beacon frame message, as described below.

The smart bracelet 120 may include one or more input/output interfaces 121, one or more communication interfaces 122, one or more digital/analog sensors 123, processing circuitry 124, including one or more processors 124a and memory 124b, and a display 125, which may all be in electronic communication with one another. The communication interfaces 122 may include wireless communication circuitry, Bluetooth communication circuitry, GPS communication circuitry, or the like. In some embodiments, the Bluetooth communication circuitry may take the form of a Bluetooth low energy (BLE) integrated circuit. The Bluetooth communication circuitry may allow the smart phone 120 to communicate using the Bluetooth protocol. The smart phone 120 may be capable of transmitting and/or receiving data using the Bluetooth circuitry. The smart phone 120, for example, using the processing circuitry 124, may be able to generate and broadcast a beacon frame message, or receive and process a beacon frame message, as described below.

The electric light 130 may include one or more communication interfaces 132, processing circuitry 134, including a processor 134a and memory 134b, control circuitry 136, and a lighting element 137 (e.g., a LED bulb), which may all be in electronic communication with one another. The communication interfaces 132 may include Bluetooth communication circuitry, which may take the form of a Bluetooth low energy (BLE) integrated circuit. The Bluetooth communication circuitry may allow the electric light 130 to communicate using the Bluetooth protocol. The electric light 130 may be capable of transmitting and/or receiving data using the Bluetooth circuitry. The electric light 130, for example, using the processing circuitry 134, may be able to receive and process a beacon frame message, as described below.

The television 140 may include one or more communication interfaces 142, processing circuitry 144, including a processor 144a and memory 144b, a display 145, and control circuitry 146, which may all be in electronic communication with one another. The communication interfaces 142 may include RF communication circuitry and Bluetooth communication circuitry, which may take the form of a Bluetooth low energy (BLE) integrated circuit. The Bluetooth communication circuitry may allow the television 140 to communicate using the Bluetooth protocol. The television 140 may be capable of transmitting and/or receiving data using the Bluetooth circuitry. The television 140, for example, using the processing circuitry 144, may be able to receive and process a beacon frame message, as described below.

The different devices (i.e., the smart bracelet 110, smart cell phone 120, electric light 130, and television 140) may communicate and interact with one another over Bluetooth in different ways. For example, the smart bracelet 110 and/or smart cell phone 120 may be able to generate and broadcast a beacon frame message that may be received and processed by the electric light 130 and/or television 140. As a more specific example, a user may wish to automatically turn the lights or television on in the living room when the user gets home. The user may configure the user's smart cell phone 120 to perform these tasks, for example, through an application running on the smart cell phone 120. The smart cell phone 120 may then monitor the geographic location of the user, for example, using GPS circuitry of the smart cell phone 120 or other positioning technologies, and may determine whether the current geographic location of the user matches with the address of the user's home, which may be stored in memory 144b. If the locations are found to match, the smart cell phone 120 may generate and broadcast a first beacon frame message, which may instruct "electric_light" devices to "power_on", and a second beacon frame message, which may instruct "television" devices to "power_on". The first beacon frame message may be received and processed by the electric light 130, which may instruct its control circuitry 136 to provide power to the lighting element 137, and the second beacon frame message may be received and processed by the television 140, which may instruct its control circuitry 146 to provide power to the display 145.

In some implementations, the smart bracelet 110 and smart cell phone 120 may operate in a coordinated fashion. The smart bracelet 110 and smart cell phone 120 may be bound to one another (e.g., through a pairing process), wherein the smart cell phone 120 may acquire the medium access control (MAC) address of the smart bracelet 110 and store the MAC address in a trusted address list. When the smart cell phone 120 determines that the user has come home (e.g., by using the GPS circuitry of the smart cell phone 120), the smart cell phone 120 may issue a control command to the smart bracelet 110. The smart bracelet 110 may receive the control command and recognize it as being issued by a trusted MAC address, and may in turn generate and broadcast a beacon frame message instructing any and all devices to "power_on". The same beacon frame message may be received and processed by the electric light 130 and television 140, which may recognize the MAC address of the smart bracelet 110 to be a trusted address, and may respectively instruct its control circuitry 136 to provide power to the lighting element 137 and instruct its control circuitry 146 to provide power to the display 145.

Beacon Frame Transmission/Reception

Figure 2:
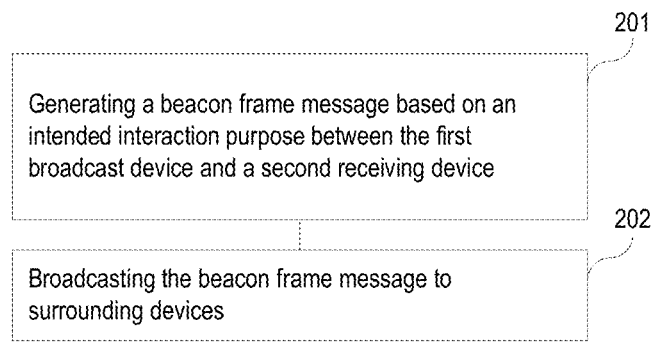
FIG. 2 illustrates some of the logic that may be employed in a message transmission method according to the present disclosure.
Figure 3:
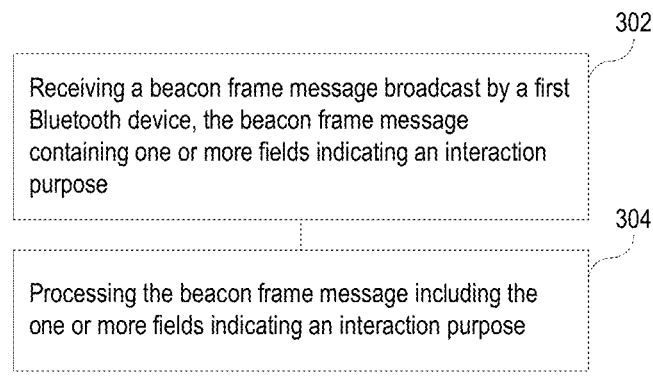
FIG. 3 illustrates some of the logic that may be employed in a message reception method according to the present disclosure.

FIGS. 2 and 3 illustrate some of the logic that may be employed in a message transmission method and a message reception method, which may be respectively performed by a first broadcasting device and a second receiving device during operation.

With reference to FIG. 2, a first broadcasting device (e.g., smart bracelet 110 or smart cell phone 120) may generate a beacon frame message, which may be generated based on an intended interaction purpose between the first broadcasting device and the second receiving device (201). The beacon frame message that is generated by the first broadcasting device may contain various fields, including one or more fields that may indicate the interaction purpose. In some embodiments, the first broadcasting device may generate the beacon frame message based on a preset mode. The first broadcasting device, for example, may generate a beacon frame message containing a product ID, which may indicate the type of the device to the second receiving device. In other embodiments, the first broadcasting device may generate the beacon frame message based on a control command received from another device that is bound to the first broadcasting device. For instance, as noted above, a smart cell phone 120 may send a control command to a smart bracelet 110. More particularly, the smart cell phone 120 may send a control command to a smart bracelet 110 that includes a command ID along with command data, which may trigger the generation of a beacon frame message. Once the beacon frame message is generated, the broadcasting device may broadcast the beacon frame message to surrounding devices (202). The first broadcasting device may only broadcast the beacon frame message once or may repeatedly broadcast the message for a particular duration at a specified interval (i.e., every 5 seconds for 30 seconds).

With reference to FIG. 3, a second receiving device may receive the beacon frame message broadcast by the first broadcasting device, which as mentioned above, may contain one or more fields indicating an interaction purpose (302). The second receiving device may then process the beacon frame message including the one or more fields containing the interaction purpose, as described in further detail below with reference to FIG. 6, and may take certain actions as a result (304).

By providing a field within the beacon frame message that indicates the interaction purpose, the receiving device and the broadcasting device may interact with one another without having to first establish a connection there between. In this way, the message transmission method is able to overcome limitations in traditional Bluetooth communication schemes.

Beacon Frame Format

The beacon frame message generated by the broadcasting device may take different formats and may include different fields. In some embodiments, for example, the beacon frame message may include a length field, a service data field, a manufacturer service field, a frame control field, a device identification field, a frame counter field, a medium access control (MAC) address field, a service information field, a capability field, an event information field, or some combination thereof. In such embodiments, the service information field, capability field, and/or event information field, may indicate the interaction purpose.

Figure 4:
FIG. 4 illustrates an example of a first format that the beacon frame message may take.
Figure 5:
FIG. 5 illustrates an example of a second format that the beacon frame message may take.

FIGS. 4 and 5 provide examples of two different formats, or structures, that the beacon frame message may take. In a first format, illustrated in FIG. 4, the first byte of the beacon frame message may be a length field, the second and third bytes may be a server data field, the forth byte may be a manufacturer service field, the fifth byte may be a service information field, the sixth byte may be a frame control field, the seventh and eight bytes may be a device identification field, the ninth byte may be a frame counter field, the tenth through fifteenth bytes may be a MAC address field, and the sixteenth byte may be a capability field. In a second format, illustrated in FIG. 5, the first through fifteenth bytes, like the first format in FIG. 4, may include a length field, a server data field, a manufacturer service field, a service information field, a frame control field, a device identification field, a frame counter field, and a MAC address field. However, in contrast to the first format, the second format may include an event information field in bytes sixteen through eighteen, where the sixteenth and seventeenth bytes may include an event identification, or event ID, sub-field and the eighteenth byte may include an event instruction, or event data, sub-field. Further description of the length field, service data field, manufacturer service field, service information field, frame control field, device identification field, frame counter field, MAC address field, capability field and event information field is provided below.

The length field (i.e., the first byte) may indicate the message length of the Bluetooth beacon frame message, which may be variable in length. For example, as illustrated in FIG. 4, the beacon frame message may be sixteen bytes in length, and so the length field could take a value of 16 (i.e., 00010000). As another example, as illustrated in FIG. 5, the beacon frame message may be eighteen bytes in length, and so the length field could take a value of 18 (i.e., 00010010). In operation, the second receiving device may extract the first byte of a received beacon message frame and recognize that the extracted information corresponds to a length field, which specifies a length of the received beacon frame message. The second receiving device may determine the value of the extracted information (e.g., 16 or 18), and based on the determined value may expect the beacon frame message to be in a particular format (e.g., the first format illustrated in FIG. 4 or the second format illustrated in FIG. 5). The second receiving device may proceed with extracting and processing information in the remainder of the beacon frame message based on the format that is expected (e.g., processing the sixteenth byte as a capability field or processing the sixteenth through eighteenth bytes as an event information field).

The server data field (i.e., the second and third bytes) may indicate a type of message, where the type is specified by the Bluetooth Special Interest Group (SIG), which is responsible for maintaining the Bluetooth specification and standards. In operation, the second receiving device may extract the second and third bytes and recognize that this information corresponds to a server data field. The second receiving device may process the extracted information in accordance with the Bluetooth specification and standards.

The manufacturer service field (i.e. the fourth byte) may identify the manufacturer of the first broadcasting device, where the values for a particular manufacturer are specified and distributed by the Bluetooth SIG. In operation, the second receiving device may extract the fourth byte and recognize that this information corresponds to a manufacturer service field. The second receiving device may determine the value of the extracted information and, based on the values distributed by the Bluetooth SIG, identify a manufacturer of the first broadcasting device.

The service information field (i.e., the fifth byte) may contain data indicative of the current mode of operation of the first broadcasting device and/or composition information of the beacon frame message. This may allow a second receiving device to determine the current operation status of the first broadcasting device and/or provide the second receiving device with details regarding the composition of the beacon frame message, notably without having to first establish a connection with the first broadcasting device.

In one embodiment, the service information field may include information regarding the current operation status of the first broadcasting device in the first three bits (i.e., bit-0 through bit-2) and composition information of the beacon frame message in the last five bits (i.e., bit-3 through bit-7). With regard to the operation status of the first broadcasting device, the first bit (i.e., bit-0) that may indicate whether the first broadcasting device has been bound with another Bluetooth device. A value of 1, for example, may indicate that the first broadcasting device is bound with another Bluetooth device, whereas a value of 0 may indicate that it is not bound with another Bluetooth device. The second bit (i.e., bit-1) may indicate whether the first broadcasting device has established a Bluetooth connection with another device. A value of 1, for example, may indicate that the first broadcasting device has established a Bluetooth connection with another device, whereas a value of 0 may indicate that a Bluetooth connection has not yet been established. The third bit (i.e., bit-2) may indicate whether the first broadcasting device is operating as a central device or a peripheral device. A value of 1, for example, may indicate that the first broadcasting device is operating as a central device, whereas a value of 0 may indicate that it is operating as a peripheral device.

As for composition information of the beacon frame message, the fourth bit (i.e., bit-3) may indicate whether the beacon frame message has been encrypted. A value of 1, for example, may indicate that the message has been encrypted, whereas a value of 0 may indicate that it is unencrypted. The fifth bit (i.e., bit-4) may indicate whether the beacon frame message includes a MAC address of the first broadcasting device, e.g., in a MAC address field. A value of 1, for example, may indicate that the message contains a MAC address, whereas a value of 0 may indicate that it does not. The sixth bit (i.e., bit-5) may indicate whether the beacon frame message includes a capability field. A value of 1, for example, may indicate that the message contains a capability field, whereas a value of 0 may indicate that it does not. The seventh bit (i.e., bit-6) may indicate whether the beacon frame message includes an event information field. A value of 1, for example, may indicate that the message contains an event information field, whereas a value of 0 may indicate that it does not. The eighth bit (i.e., bit-7) may indicate whether the beacon frame message carries manufacturer-defined data. A value of 1, for example, may indicate that the message contains manufacturer defined data, whereas a value of 0 may indicate that the message does not contain manufacturer defined data. The manufacture defined data may be reserved for use by application developers. In some implementations, the manufacture defined data may be placed in the beacon frame message before the event data.

Figure 6:
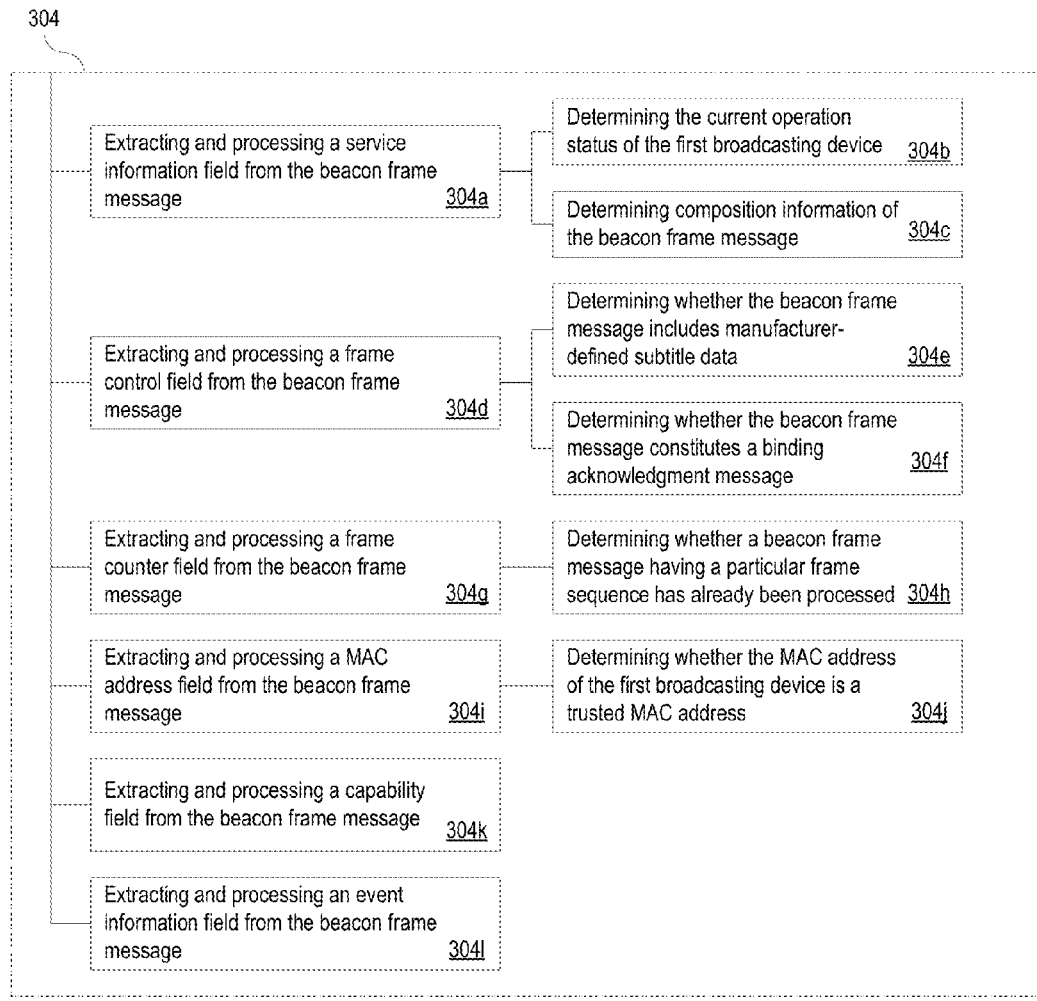
FIG. 6 illustrates additional logic that may be employed in a message reception method.

With reference to FIG. 6, the second receiving device, during operation, may extract the fifth byte of a received beacon message frame and recognize that the extracted information corresponds to a service information field (304a). The second receiving device may examine the extracted service information field to determine the operation status of the first broadcasting device (304b) and to determine composition information for the beacon message frame (304c). The second receiving device, for example, may examine the first bit of the extracted service information field to determine whether the first broadcasting device has been bound with another Bluetooth device, examine the second bit of the extracted service information field to determine whether the first broadcasting device has established a connection with another Bluetooth device, and examine the third bit of the extracted service information field to determine whether the first broadcasting device is operating as a central or peripheral device. The second receiving device may also examine the fourth bit to determine whether the beacon frame message has been encrypted, examine the fifth bit to determine whether the beacon frame message includes a MAC address of the first broadcasting device (i.e., a MAC address field), examine the sixth bit to determine whether the beacon frame message includes a list of capabilities of the first broadcasting device (i.e., a capability field), examine the seventh bit to determine whether the beacon frame message includes instructions for controlling the second receiving device (i.e., an event information field), and examine the eighth bit to determine whether the beacon frame message includes manufacturer-defined data. The second receiving device may make use of the message composition information to determine whether to process, or skip processing, particular fields. The second receiving device, for example, may look at the message composition information to determine whether the beacon frame message includes a MAC address field or indicates that the beacon frame message has been encrypted. If the composition information indicates that a MAC address field is included, the second receiving device may examine the MAC address field to determine whether the beacon frame message is applicable to the second receiving device. Similarly, if the composition information indicates that the message has been encrypted, the second receiving device may proceed with decryption of themessage. The manner in which the beacon frame messages is encrypted and/or decrypted may be controlled by the developer of the application operating on the second receiving device.

As a more specific example, the second receiving device may receive a beacon frame message from a first broadcasting device that is a mobile power source. The beacon frame message generated by the mobile power source may contain a service information field having a value of 132 (or 10000100). The second receiving device may examine the extracted service information field and determine that the mobile power source has not been bound with another Bluetooth device; the mobile power source has not established a Bluetooth connection with another device; the mobile power source is currently operating as a peripheral device; the beacon frame message is not encrypted; the beacon frame message does not contain a MAC address field; the beacon frame message does contain a capability field; the beacon frame message does not contain an event information field; and the beacon frame message does not contain manufacturer-defined data.

As another example, as described above, a smart bracelet 110 may generate a beacon frame message instructing a television 140 or electric light 130 to power-on. In this example, the value of the service information field may be 106 (or 01101010). The television 140 or electric light 130 when receiving and processing the beacon message frame may determine that the smart bracelet 110 has been bound with another device; the smart bracelet 110 has established a Bluetooth connection with another device; the smart bracelet is currently operating a central device; the beacon frame message is not encrypted; the beacon frame message contains a MAC address field; the beacon frame message does not contain a capability field; the beacon frame message contains an event information field; and the beacon frame message does not contain manufacturer-defined data.

Figure 7:
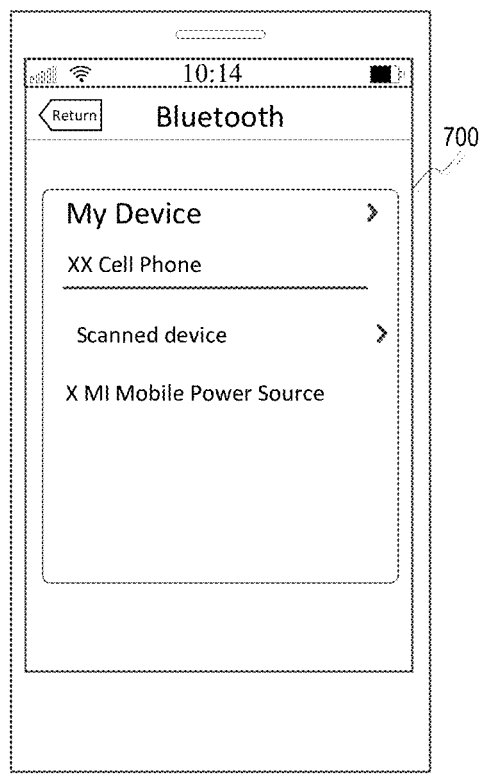
FIG. 7 illustrates a first view of an interface presented on a display of an apparatus according to the present disclosure.

The frame control field (i.e., the sixth byte) may contain additional data regarding the beacon frame message. By way of example, the frame control field may include a first bit (i.e., bit-0) that may indicate whether the beacon frame message carries manufacturer-defined subtitle data. A value of 1, for example, may indicate that the message contains manufacturer-defined subtitle data, whereas a value of 0 may indicate that it does not. The manufacture-defined subtitle data may be reserved for use by application developers. In some implementations, the manufacture-defiend subtitle data may be provided in the beacon frame messae immediately following the manufacture-defined data. The second bit (i.e., bit-1) may indicate whether the Bluetooth beacon frame message constitutes a binding acknowledgement message. A value of 1, for example, may indicate that the message is a binding acknowledgment message, whereas a value of 0 may indicate that it is not. A binding acknowledgment message may used to communicate the binding state of the first broadcasting device. When the beacon frame message is received by the second receiving device, a message may be pushed to the user through the application running on the device that indicates the presence and binding state of the first broadcasting device. The remaining bits (i.e., bit-2 through bit-7) may be reserved bits that are used for other purposes. Again with reference to FIG. 6, the second receiving device, during operation, may extract the sixth byte of a received beacon message frame and recognize that the extracted information corresponds to a frame control field (304d). The second receiving device may examine the extracted frame control field to determine whether the beacon frame message includes manufacturer-defined subtitle data, for example, by examining the first bit of the extracted frame control field (304e), and/or determine whether the beacon frame message constitutes a binding acknowledgment message, for example, by examining the second bit of the extracted frame control field (304f). In operation, the second receiving device may determine a value of the manufacturer-defined subtitle data. For example, the second receiving device may determine that the manufacturer-defined subtitle data is "xx". The second receiving device may present this information on a display of the second receiving device, for example, as illustrated in FIG. 7.

The device identification field (i.e., the seventh and eighth bytes), or product ID field, may provide a name for the device broadcasting the beacon message. In operation, the second receiving device may extract the seventh and eighth bytes of the beacon frame message and recognize that the extracted information corresponds to a device identification field. The second receiving device may examine the extracted information and determine a product ID, which may correspond to a particular device name. The second receiving device, for example, may determine that the product ID is "C2" corresponding to device name of the first broadcasting device is "portable source". The second receiving device may present this information on a display of the second receiving device, for example, as illustrated in FIG. 7.

The frame counter field (i.e., the ninth byte) may indicate a frame sequence of the beacon frame message, which may uniquely identify different beacon frame messages generated by the first broadcasting device. The first broadcasting device, for example, may mark a beacon message frame with a frame sequence value when a beacon frame message is generated. The frame sequence value may be incremented each time a new beacon frame message is generated, allowing each beacon frame message to be uniquely identified. As noted above, the first broadcasting device may repeatedly broadcast a particular beacon frame message that is generated, but the beacon frame message will contain the same frame sequence value. By examining the frame sequence value, a second receiving device may be able to ignore or discard beacon frame messages that are duplicative of beacon frame messages that were already received and processed. In this way, repeated processing of beacon frame messages can be avoided and the waste of device resources may be reduced.

Again with reference to FIG. 6, the second receiving device, during operation, may extract the ninth byte of the beacon frame message and recognize that the extracted information corresponds to a frame counter field (304g). The second receiving device may determine a frame sequence value of the extracted frame counter field and compare the determined frame sequence value to a list or database of frame sequence values stored on the second receiving device, which may correspond to other beacon frame messages that were previously received and/or processed (304h). If the second receiving device finds a matching value in the database, the beacon frame message may be discarded. Alternatively, if no match is found, the second receiving device may proceed with processing the beacon frame message. The second receiving device may also add the frame sequence value to the list or database of frame sequence values stored on the second receiving device. Since there are a finite number of frame sequence values (e.g., in the case of a one byte frame counter field there may be 256 unique values), the list or database may delete or purge frame sequence values in the database after a specified period of time (e.g., after 60 seconds). The second receiving device may also look at other parmaeters when comparing frame sequence values. By way of example, the second receiving device may look at the MAC address field in order to distinguish messages received from different devices, which may coincidentally have the same frame sequence value.

The MAC address field (i.e., the tenth through fifteenth bytes) may identify the MAC address of the first broadcasting device. In operation, the second receiving device may extract the tenth through fifteenth bytes and recognize that the extracted information corresponds to a MAC address field (304*i*). The second receiving device may determine a MAC address value contained in the extracted information (e.g., 00:A0:C9:14:C8:29) and may compare the determined MAC address value to a list or database of trusted MAC address values stored on the second receiving device (304*j*). In some embodiments, some or all of the processing of the beacon frame message may be conditioned upon the second receiving device determining that the MAC address value corresponds to a trusted device.

The capability field (i.e., the sixteenth byte in FIG. 4) may indicate different capabilities of the first broadcasting device, thereby allowing a receiving device to determine the capabilities without having to establish a connection with the first broadcasting device. By way of example, in one embodiment, the capability field may include a first bit (i.e., bit-0) indicating whether the first broadcasting device has a capability to establish a Bluetooth connection. A value of 1, for example, may indicate that the first broadcasting device is capable of establishing a Bluetooth connection, whereas a value of 0 may indicate that it is not. The second bit (i.e., bit-1) may indicate whether the first broadcasting device is capable of serving as a central device. A value of 1, for example, may indicate that the first broadcasting device is capable of serving as a central device, whereas a value of 0 may indicate that it is not. The third bit (i.e., bit-2) may indicate whether the first broadcasting device is capable of performing encryption. A value of 1, for example, may indicate that the first broadcasting device can perform encryption, whereas a value of 0 may indicate that the first broadcasting device is unable to perform encryption. The fourth bit (i.e., bit-3) may indicate whether the first broadcasting device has input/output capabilities. A value of 1, for example, may indicate that the first broadcasting device has input/output capabilities (e.g., an input button or an output display screen), whereas a value of 0 may indicate that it does not. The remaining bits (i.e., bit-4 through bit-7) may be reserved bits that are used for other purposes.

In some embodiments, again with reference to FIG. 6, the second receiving device, during operation, may extract the sixteenth byte of a received beacon message frame and recognize that the extracted information corresponds to a capability field (304*k*). The second receiving device may examine the extracted capability field to determine the capabilities of the first broadcasting device. The second receiving device, for example, may examine the first bit of the extracted capability field to determine whether the first broadcasting device is capable of establishing a Bluetooth connection, examine the second bit of the extracted capability field to determine whether the first broadcasting device is capable of serving as a central device, examine the third bit of the extracted capability field to determine whether the first broadcasting device is capable of performing encryption, and examine the fourth bit of the extracted capability field to determine whether the first broadcasting device has input/output capabilities.

As a more specific example, the second receiving device may receive a beacon frame message from a first broadcasting device that is a mobile power source. The beacon frame message generated by the mobile power source may contain a capability field having a value of 0 (or 00000000). The second receiving device may examine the first four bits of the extracted capability field and determine that the mobile power source does not have a capability to establish a connection; the mobile power source does not have a capability to serve as a central device; the mobile power source does not have a capability to perform encryption; and the mobile power source does not have a capability to input/output.

The event information field (i.e., the sixteenth to eighteenth bytes in FIG. 5) may contain an event instruction for controlling a receiving Bluetooth device. The event information field may itself include an event identification sub-field (i.e., the sixteenth and seventeenth bytes in FIG. 5) and an event instruction sub-field (i.e., the eighteenth byte in FIG. 5), the event identification sub-field (event ID field) identifying a second receiving device and the event instruction sub-field (event data field) specifying an event that is to be executed by the second receiving device. In some embodiments, the event information field may not contain an event identification sub-field, or the event-identification sub-field may identify a default device (e.g., by specifying a 'null' value). In such cases, the event instruction sub-field may specify an event to be performed by a default second receiving device. The default second receiving device may be any Bluetooth device capable of executing the event specified in the event instruction sub-field. By including the event information field, the first broadcasting device may be able to control a second receiving device without having to first establish a connection with the second receiving device. In addition, the first broadcasting device may be able to control several second receiving devices simultaneously, which connection-based schemes simply do not allow.

In some embodiments, again with reference to FIG. 6, the second receiving device, during operation, may extract the sixteenth through eighteenth bytes of a received beacon message frame and recognize that the extracted information corresponds to an event information field, with the sixteenth and seventeenth bytes corresponding to an event identification sub-field and the eighteenth byte corresponding to an event instruction sub-field (304*l*). The second receiving device may examine the extracted event identification sub-field to determine whether the event instruction may be applicable to the second receiving device (i.e., it specifically identifies the second receiving device or specifies a default device). If the second receiving device determines that the event instruction may apply, the second receiving device may examine the event instruction sub-field to determine what action to take.

As a more specific example, the second receiving device may be an electric light 130 and may receive a beacon frame message from a first broadcasting device, which may be a smart phone 120. The beacon frame message may contain an event information field having an event identification sub-field value of "0A" and an event instruction sub-field value of "01". The electric light 130 may examine the event identification sub-field and determine that "0A" corresponds to "electric light" and identifies the electric light 130, and may examine the event instruction sub-field to determine that "01" corresponds to "power_on". The electric light 130 in response to the "power_on" instruction may instruct its control circuitry 136 to provide power to a lighting element 137 (e.g., an LED bulb) of the electric light 130.

The beacon frame message may alternatively specify a value of "any_device" or "null," in which case the electric light 130 may determine whether the event instruction (i.e., "power_on") is applicable to it. In some cases, the event instruction may not be applicable (e.g., an electric light 130 may not be able to "increase_volume"), but in others it might be. If the event instruction is applicable, the electric light 130 may choose to execute the instruction. The same beacon frame message may also be received and processed by a nearby television 140, which may also find the event instruction sub-field of "power_on" applicable, and may instruct the control circuitry 146 of the television 140 to turn on its display 145.

In the foregoing description, numerical identifiers like "first," "second," and "third" are provided for descriptive purposes, to help distinguish between different bits and bytes within the beacon frame message and its fields, but are not intended to connote a particular sequence or arrangement. A person of ordinary skill in the art would readily appreciate that the particular fields, bytes and bits of the beacon frame message could be assigned in different arrangements, and that FIGS. 4 and 5 are simply exemplary illustrations. User Interface FIG. 7 illustrates a first view of an interface 700 presented on a display of a device (e.g., smart cell phone 120) according to the present disclosure. As illustrated in FIG. 7, the interface may provide a listing of different Bluetooth devices, which the device may have recognized. The interface may list the device itself (i.e., "My Device") and identify the device by its device name (e.g., "XX Cell Phone"). This device name may be included as part of a beacon frame message generated by the device, for example, as part of the device identification field. The interface may also list other Bluetooth devices that are within a surrounding area of the device (i.e., "Scanned device"), for example, based on beacon frame messages that the device has received. These other Bluetooth devices may be identified by their device name (e.g., "X MI Mobile Power Source"), which may have been provided in the device identification field of the beacon frame message upon which they were identified. The interface 700 may allow a user to refresh a listing of surrounding Bluetooth devices, for example, by selecting a button or other icon provided on the interface (e.g., by selecting the ">" provided next to the "Scanned device" listing). The interface 700 may also allow the user to select one of the surrounding Bluetooth devices from the listing and provide the user with the ability to take certain actions. The interface 700, for example, may allow the user to issue a control command that may be sent to another device with which the device is bound.

Transmission/Reception Apparatus

The following description describes different embodiments of this disclosure which may be used to perform the transmission and reception methods described above. The foregoing description may provide additional details that are not expressly disclosed when describing the apparatus embodiments below.

Figure 8:
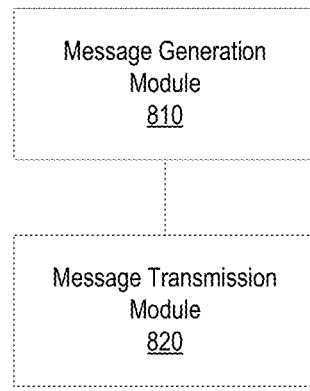
FIG. 8 illustrates a block diagram showing the structure of a first embodiment of a message transmission apparatus according to the present disclosure.

FIG. 8 illustrates a block diagram showing the structure of a first embodiment of a message transmission apparatus according to the present disclosure. The message transmission apparatus may be realized by software, hardware or a combination thereof, and may form the whole or a part of an electronic device that can perform a message transmission method.

The message transmission apparatus may include a message generation module 810 configured to generate a beacon frame message based on an interaction purpose with a second Bluetooth device, and a message transmission module 820 configured to broadcast the Bluetooth beacon frame message using a Bluetooth communication interface. The beacon frame message generated by the message generation module 810 may include different fields, including one or more fields indicating the interaction purpose. For example, as described above, the beacon frame message may include a length field, a service data field, a manufacturer service field, a frame control field, a device identification field, a frame counter field, a medium access control (MAC) address field, a service information field, a capability field, an event information field, or some combination thereof, where the service information field, capability field, and/or event information field, may indicate the interaction purpose.

Figure 9:
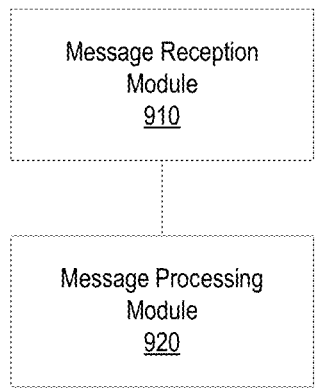
FIG. 9 illustrates a block diagram showing the structure of a first embodiment of a message reception apparatus according to the present disclosure.

FIG. 9 illustrates a block diagram showing the structure of a first embodiment of a message reception apparatus according to the present disclosure. The message reception apparatus may be realized by software, hardware or a combination thereof, and may form the whole or a part of an electronic device that can perform a message reception method.

The message reception apparatus may include a message reception module 910 configured to receive a beacon frame message generated and broadcast by a first Bluetooth device using a Bluetooth communication interface, and a message processing module 920 configured to process the beacon frame message. The received beacon frame message may contain one or more fields indicating an interaction purpose, and the message processing module 920 may be able to process these fields.

Figure 10:
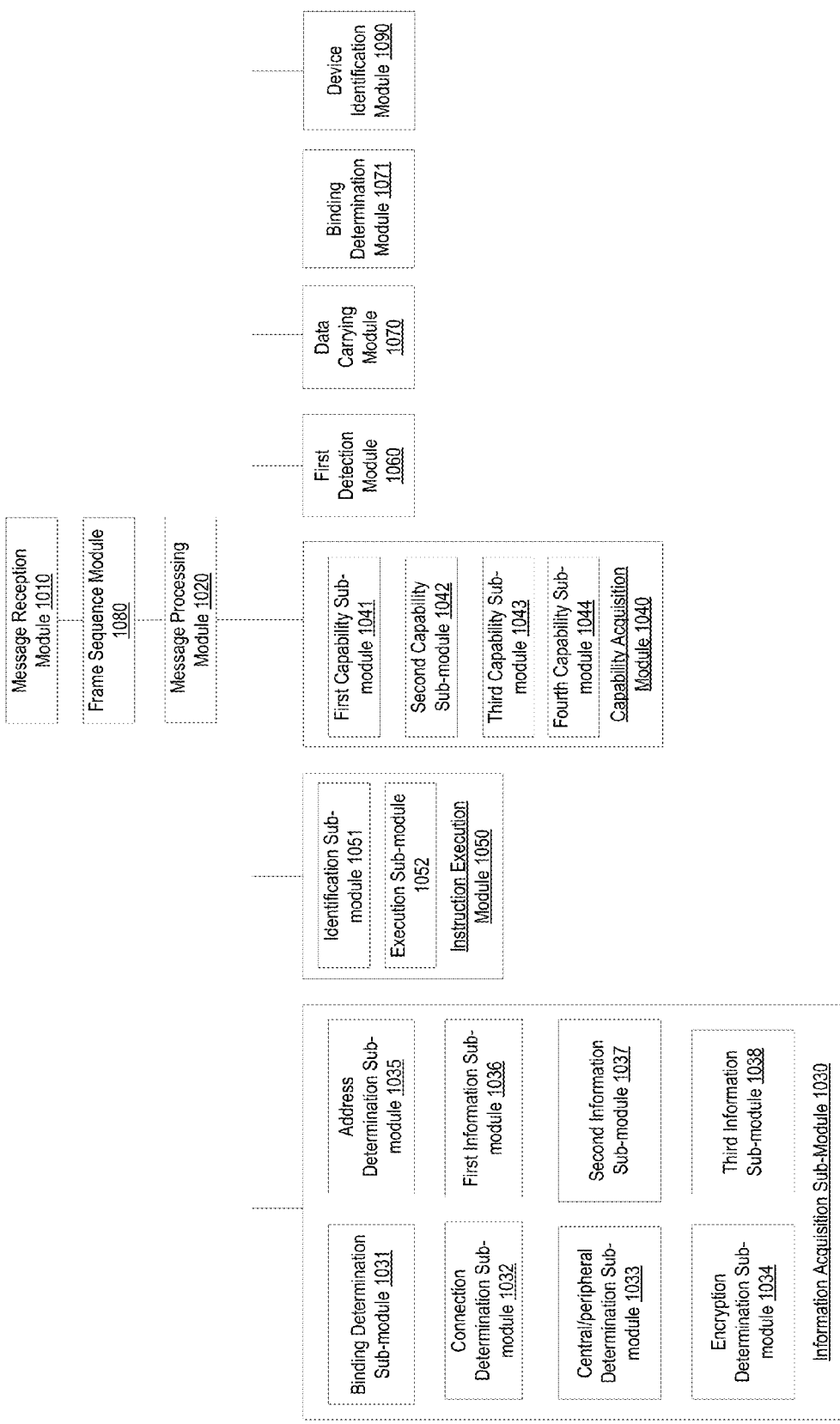
FIG. 10 illustrates a block diagram showing the structure of another embodiment of a message reception apparatus according to the present disclosure.

FIG. 10 is a block diagram showing the structure of another embodiment of a message reception apparatus according to the present disclosure. The message reception apparatus may be realized by software, hardware or a combination thereof, and may form the whole or a part of an electronic device that can provide a message reception method. The message reception apparatus may include a message reception module 1010 configured to receive a beacon frame message generated and broadcast by a first Bluetooth device using a Bluetooth communication interface, and a message processing module 1020 configured to process the beacon frame message. The received beacon frame message may contain one or more fields indicating an interaction purpose, and the message processing module 1020 may be able to process these fields.

The apparatus may also include an information acquisition module 1030 configured to process a service information field included within the beacon frame message. The information acquisition module 1030, for example, may be configured to determine the operation status of the first Bluetooth device and/or determine composition information of the beacon message frame. The information acquisition module 1030 may itself include a binding determination sub-module 1031 configured to determine whether the first Bluetooth device has been bound with another Bluetooth device based on a first bit of the service information field, a connection determination sub-module 1032 configured to determine whether the first Bluetooth device has established a connection with another Bluetooth device based on a second bit of the service information field, and a central/peripheral determination sub-module 1033 configured to determine whether the first Bluetooth device is operating as a central or peripheral device based on a third bit of the service information field. The information acquisition module 1030 may further include an encryption determination sub-module 1034 configured to determine whether the beacon frame message has been encrypted based on a fourth bit of the service information field, an address determination sub-module 1035 configured to determine whether the beacon frame message includes a MAC address of the first Bluetooth device based on a fifth bit of the service information field, a first information sub-module 1036 configured to determine whether the beacon frame message includes a list of capabilities of the first Bluetooth device based on a sixth bit of the service information field, a second information sub-module 1037 configured to determine whether the beacon frame message includes an event information field including instructions for controlling the apparatus based on a seventh bit of the service information field, and a third information sub-module 1038 configured to determine whether the beacon frame message includes manufacturer-defined data based on an eighth bit of the service information field.

The apparatus may also include a capability acquisition module 1040 configured to process a capability field included within the beacon frame message. The capability acquisition module 1040, for example, may be configured to determine the capabilities of the first Bluetooth device. The capability acquisition module 1040 may itself include a first capability sub-module 141 configured to determine whether the first Bluetooth device is capable of establishing a Bluetooth connection based on a first bit of the capability field, a second capability sub-module 1042 configured to determine whether the first Bluetooth device is capable of serving as a central device based on a second bit of the capability field; a third capability sub-module 1043 configured to acquire whether the first Bluetooth device is capable of performing encryption based on a third bit of the capability field, and a fourth capability sub-module 1044 configured to determine whether the first Bluetooth device has input and output capabilities based on a fourth bit of the capability field.

The apparatus may also include an instruction execution model 1050 configured to process an event information field, which may further include a first identification sub-module 1051 configured to determine whether an event identification sub-field in the event information field identifies the second Bluetooth device, and an event execution sub-module 1052 configured to execute an event contained in an event instruction sub-field of the event information field.

The apparatus may also include a first detection module 1060 configured to process a MAC address field included within the beacon frame message and determine a MAC address value contained in the MAC address field and compare the determined MAC address value to a list or database of trusted MAC address values.

The apparatus may also include modules for processing a frame control field included within the beacon frame message. These modules may include a data carrying module 1070 configured to determine whether the beacon frame message includes manufacturer-defined subtitle data based on a first bit of the extracted frame control field and/or a binding determination module 1071 configured to determine whether the beacon frame message constitutes a binding acknowledgment message based on the second bit of the extracted frame control field.

The apparatus may also include a frame sequence module 1080 for processing a frame counter field included within the beacon frame message, where the frame sequence module 1080 is configured to determine a frame sequence value of the frame counter field and compare the determined frame sequence value to a list or database of frame sequence values, which may correspond to other beacon frame messages that were previously received and/or processed. If the frame sequence module 1080 finds a matching value in the database, the beacon frame message may be discarded. Alternatively, if the frame sequence module fails to find a match, the apparatus may proceed with processing the beacon frame message The apparatus may also include a device identification module 1090 for processing a device identification field included within the beacon frame message, where the device identification module 1090 is configured to determine a device name of the first Bluetooth device contained in the device identification field.

With respect to the apparatuses in the above embodiments, the specific manners for performing operations for individual modules therein have been described in detail in the embodiments regarding the related methods, which will not be elaborated herein.

Figure 11:
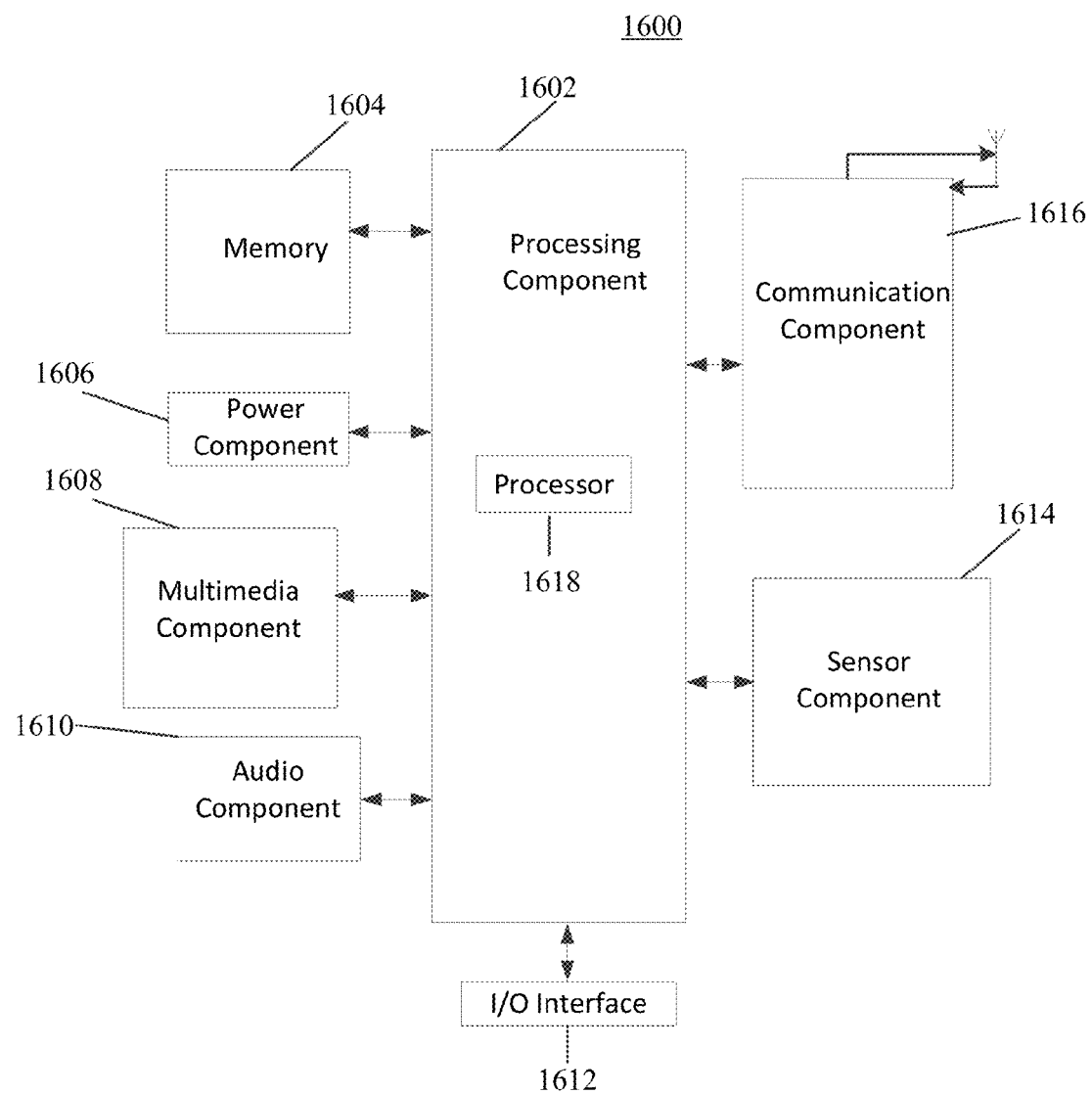
FIG. 11 is a block diagram of an apparatus for performing the transmission and reception methods described in the present disclosure.

FIG. 11 is a block diagram of an apparatus for performing the transmission and reception methods described in the present disclosure. For example, the apparatus 1600 may be a mobile phone, a computer, a digital broadcast terminal, a messaging device, a gaming console, a tablet, a medical device, a fitness equipment, a personal digital assistant or the like. Referring to FIG. 11, the apparatus 1600 may include one or more of the following components: a processing component 1602, a memory 1604, a power component 1606, a multimedia component 1608, an audio component 1610, an input/output (I/O) interface 1612, a sensor component 1614, and a communication component 1616.

The communication component 1616 is provided with a Bluetooth module inside. The Bluetooth module supports a standard Bluetooth low energy BLE protocol, and comprises a control chip and a Bluetooth chip connected to the control chip.

The processing component 1602 typically controls overall operations of the apparatus 1600, such as the operations associated with display, telephone calls, data communications, camera operations, and recording operations. The processing component 1602 may include one or more processors 1618 to execute instructions to perform all or part of the steps in the above described methods. Moreover, the processing component 1602 may include one or more modules which facilitate the interaction between the processing component 1602 and other components. For instance, the processing component 1602 may include a multimedia module to facilitate the interaction between the multimedia component 1608 and the processing component 1602.

The memory 1604 is configured to store various types of data to support the operation of the apparatus 1600. Examples of such data include instructions for any applications or methods operated on the apparatus 1600, contact data, phonebook data, messages, pictures, video, etc. The memory 1604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1606 provides power to various components of the apparatus 1600. The power component 1606 may include a power supply management system, one or more power sources, and any other components associated with the generation, management, and distribution of power in the apparatus 1600.

The multimedia component 1608 includes a screen providing an output interface between the apparatus 1600 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1608 includes a front camera and/or a rear camera. The front camera and/or the rear camera may receive an external multimedia datum while the apparatus 1600 is in an operation mode, such as a photographing mode or a video mode. Each of the front camera and the rear camera may be a fixed optical lens system or have focus and optical zoom capability.

The audio component 1610 is configured to output and/or input audio signals. For example, the audio component 1610 includes a microphone (MIC) configured to receive an external audio signal when the apparatus 1600 is in an operation mode, such as a call mode, a recording mode, and a voice recognition mode. The received audio signal may be further stored in the memory 1604 or transmitted via the communication component 1616. In some embodiments, the audio component 1610 further includes a speaker to output audio signals.

The I/O interface 1612 provides an interface between the processing component 1602 and peripheral interface modules, such as a keyboard, a click wheel, buttons, and the like. The buttons may include, but are not limited to, a home button, a volume button, a starting button, and a locking button.

The sensor component 1614 includes one or more sensors to provide status assessments of various aspects of the apparatus 1600. For instance, the sensor component 1614 may detect an open/closed status of the apparatus 1600, relative positioning of components, e.g., the display and the keypad, of the apparatus 1600, a change in position of the apparatus 1600 or a component of the apparatus 1600, a presence or absence of user contact with the apparatus 1600, an orientation or an acceleration/deceleration of the apparatus 1600, and a change in temperature of the apparatus 1600. The sensor component 1614 may include a proximity sensor configured to detect the presence of nearby objects without any physical contact. The sensor component 1614 may also include a light sensor, such as a CMOS or CCD image sensor, for use in imaging applications. In some embodiments, the sensor component 1614 may also include an accelerometer sensor, a gyroscope sensor, a magnetic sensor, a pressure sensor, or a temperature sensor.

The communication component 1616 is configured to facilitate communication, wired or wirelessly, between the apparatus 1600 and other devices. The apparatus 1600 can access a wireless network based on a communication standard, such as WiFi, 2G, or 3G, or a combination thereof. In one exemplary embodiment, the communication component 1616 receives a broadcast signal or broadcast associated information from an external broadcast management system via a broadcast channel. In one exemplary embodiment, the communication component 1616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 1600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described message transmission and reception methods.

In exemplary embodiments, there is also provided a non-transitory computer-readable storage medium including instructions, such as included in the memory 1604, executable by the processor 1618 in the apparatus 1600, for performing the above-described methods. For example, the non-transitory computer-readable storage medium may be a ROM, a RAM, a CD-ROM, a magnetic tape, a floppy disc, an optical data storage device, and the like.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

The invention claimed is:

1. A message transmission method performed by a first Bluetooth device, comprising:
   generating, by a processor of the first Bluetooth device, a beacon frame message based on an intended interaction purpose with a second Bluetooth device;
   broadcasting the beacon frame message using a Bluetooth communication interface of the first Bluetooth device;
   wherein the beacon frame message contains one or more fields indicating the interaction purpose, and a frame counter field indicating a frame sequence of the beacon frame message,
   wherein the one or more fields of the beacon frame message indicating the interaction purpose comprises an event information field; and
   the beacon frame message is processed at the second Bluetooth device by:
      extracting the event information field from the beacon frame message, wherein extracting the event information field further comprises:
         extracting an event identification sub-field; and
         extracting an event instruction sub-field;
      examining the extracted event identification sub-field to determine whether the second Bluetooth device is identified in the extracted event identification sub-field; and
      when a determination is made that the second Bluetooth device is identified in the extracted event identification sub-field, executing an event instruction contained within the extracted event instruction sub-field by the second Bluetooth device.

2. The method of claim 1, wherein the one or more fields of the beacon frame message indicating the interaction purpose comprises a service information field comprising data indicative of a current operation status of the first Bluetooth device, composition information of the beacon frame message broadcast by the first Bluetooth device, or some combination thereof.

3. The method of claim 2, wherein the service information field is one byte in length and comprises one or more of:
a first bit indicating whether the first Bluetooth device has been bound with another Bluetooth device;
a second bit indicating whether the first Bluetooth device has established a Bluetooth connection with another Bluetooth device;
a third bit indicating whether the first Bluetooth device is a central device or a peripheral device;
a fourth bit indicating whether the beacon frame message has been encrypted;
a fifth bit indicating whether the beacon frame message carries a medium access control (MAC) address of the first Bluetooth device;
a sixth bit indicating whether the beacon frame message carries a capability field;
a seventh bit indicating whether the beacon frame message carries an event information field; or
an eighth bit indicating whether the beacon frame message carries manufacturer-defined data.

4. The method of claim 1, wherein the one or more fields of the beacon frame message indicating the interaction purpose comprises a capability information field comprising data indicative of one or more capabilities of the first Bluetooth device.

5. The method of claim 4, wherein the capability field is one byte in length and comprises one or more of:
a first bit indicating whether the first Bluetooth device has a capability to establish a Bluetooth connection;
a second bit indicating whether the first Bluetooth device has a capability to serve as a central device;
a third bit indicating whether the first Bluetooth device has an encryption capability; or
a fourth bit indicating whether the first Bluetooth device has input and output capabilities.

6. The method of claim 1, wherein the one or more fields of the beacon frame message indicating the interaction purpose comprises an event information field comprising an event instruction for controlling a second Bluetooth device;
wherein the event information field further comprises:
an event identification sub-field specifying the second Bluetooth device; and
an event instruction sub-field specifying an event that is to be executed by the second Bluetooth device; or
wherein the event information field further comprises:
an event instruction sub-field specifying an event to be executed by a default second Bluetooth device.

7. The method of claim 1, wherein the beacon frame message further comprises one or more of:
a device identification field indicating a device name of the first Bluetooth device;
a MAC address field indicating a MAC address of the first Bluetooth device;
a frame control field, the frame control field comprising one or more of:
a first bit indicating whether the beacon frame message carries manufacturer-defined subtitle data; or
a second bit indicating whether the beacon frame message is a binding acknowledgement message.

8. The method of claim 1, further comprising:
examining the extracted event identification sub-field to determine if a default device is identified;
when a determination is made that the default device is identified in the extracted event identification sub-field, examining the extracted event instruction sub-field to determine whether the event instruction contained within the extracted event identification sub-field is executable by the second Bluetooth device; and
when a determination is made that the event instruction contained within the extracted event identification sub-field is executable by the second Bluetooth device, executing the event instruction.

9. A message reception method performed by a second Bluetooth device, comprising:
receiving a beacon frame message generated by a first Bluetooth device using a Bluetooth communication interface of the second Bluetooth device;
wherein the beacon frame message contains one or more fields indicating an interaction purpose;
processing the beacon frame message including the one or more fields indicating the interaction purpose, and a frame counter field indicating a frame sequence of the beacon frame message,
wherein the one or more fields of the beacon frame message indicating the interaction purpose comprises an event information field; and
processing the beacon frame message comprises:
extracting the event information field from the beacon frame message, wherein extracting the event information field further comprises:
extracting an event identification sub-field; and
extracting an event instruction sub-field;
examining the extracted event identification sub-field to determine whether the second Bluetooth device is identified in the extracted event identification sub-field; and
when a determination is made that the second Bluetooth device is identified in the extracted event identification sub-field, executing an event instruction contained within the extracted event instruction sub-field by the second Bluetooth device.

10. The method of claim 9, wherein the one or more fields of the beacon frame message indicating the interaction purpose comprises a service information field; and
processing the beacon frame message comprises:
extracting the service information field from the beacon frame message; and
examining the extracted service information field to determine a current operation status of the first Bluetooth device, composition information of the beacon frame message, or some combination thereof.

11. The method of claim 10, wherein examining the extracted service information field to determine a current operation status of the first Bluetooth device further comprises one or more of:
examining a first bit of the extracted service information field to determine whether the first Bluetooth device has been bound with another Bluetooth device;
examining a second bit of the extracted service information field to determine whether the first Bluetooth device has established a connection with another Bluetooth device; or examining a third bit of the extracted service information field to determine whether the first Bluetooth device is operating as a central or peripheral device.

12. The method of claim 10, wherein examining the extracted service information field to determine composition information of the beacon frame message further comprises one or more of:
examining a fourth bit to determine whether the beacon frame message has been encrypted;
examining a fifth bit to determine whether the beacon frame message includes a MAC address of the first Bluetooth device;
examining a sixth bit to determine whether the beacon frame message includes a list of capabilities of the first Bluetooth device;
examining a seventh bit to determine whether the beacon frame message includes instructions for controlling the second Bluetooth device; or
examining an eighth bit to determine whether the beacon frame message includes manufacturer-defined data.

13. The method of claim 9, wherein the one or more fields of the beacon frame message indicating the interaction purpose comprises a capability field; and
processing the beacon frame message comprises:
extracting the capability field from the beacon frame message; and
examining the extracted capability field to determine a set of capabilities of the first Bluetooth device, wherein examining the extracted capability field further comprises one or more of:
examining a first bit of the extracted capability field to determine whether the first Bluetooth device is capable of establishing a Bluetooth connection;
examining a second bit of the extracted capability field to determine whether the first Bluetooth device is capable of serving as a central device;
examining a third bit of the extracted capability field to determine whether the first Bluetooth device is capable of performing encryption; or
examining a the fourth bit of the extracted capability field to determine whether the first Bluetooth device has input/output capabilities.

14. The method of claim 9, wherein the beacon frame message comprises a device identification field; and
processing the beacon frame message comprises:
extracting the device identification field from the beacon frame message;
examining the extracted device identification field to determine a device name of the first Bluetooth device; and
displaying the device name of the first Bluetooth device on a display of the second Bluetooth device.

15. The method of claim 9, wherein the beacon frame message comprises a MAC address field; and
processing the beacon frame message comprises:
extracting the MAC address field from the beacon frame message;
examining the extracted MAC address field to determine whether the first Bluetooth device is a trusted device; and
based on a determination that the first Bluetooth device is a trusted device, continuing processing of the beacon frame message.

16. The method of claim 9, wherein the beacon frame message comprises a frame control field; and
processing the beacon frame message comprises:
extracting the frame control field from the beacon frame message; and
examining one or more of a first bit of the extracted frame control field to determine whether the beacon frame message includes manufacturer-defined sub-title data, or a second bit of the extracted frame control field to determine whether the beacon frame message constitutes a binding acknowledgment message.

17. The method of claim 9, wherein
processing the beacon frame message comprises:
extracting the frame counter field from the beacon frame message;
examining the extracted frame counter field to determine a frame sequence value;
determining whether another beacon frame message having a same frame sequence value has been previously processed;
when a determination is made that another beacon frame message has been previously processed, terminating processing of the beacon frame message; and
when a determination is made that another beacon frame message has not been previously processed, continuing processing of the beacon frame message.

18. A message transmission apparatus, comprising:
a processor;
a Bluetooth communication interface in communication with the processor; and
a memory in communication with the processor storing instructions executable by the processor, wherein the processor is configured to:
generate a beacon frame message based on an intended interaction purpose with a second Bluetooth device, wherein the beacon frame message contains one or more fields indicating the interaction purpose, and a frame counter field indicating a frame sequence of the beacon frame message; and
broadcast the beacon frame message via the Bluetooth communication interface,
wherein the one or more fields of the beacon frame message indicating the interaction purpose comprises an event information field; and
the beacon frame message is processed at the second Bluetooth device by:
extracting the event information field from the beacon frame message, wherein extracting the event information field further comprises:
extracting an event identification sub-field; and
extracting an event instruction sub-field;
examining the extracted event identification sub-field to determine whether the second Bluetooth device is identified in the extracted event identification sub-field; and
when a determination is made that the second Bluetooth device is identified in the extracted event identification sub-field, executing an event instruction contained within the extracted event instruction sub-field by the second Bluetooth device.

* * * * *